Patented Nov. 5, 1929

1,734,519

UNITED STATES PATENT OFFICE

CARL N. HAND, OF NITRO, WEST VIRGINIA, ASSIGNOR TO THE RUBBER SERVICE LABORATORIES CO., OF AKRON, OHIO, A CORPORATION

MANUFACTURE AND USE OF INSECTICIDES

No Drawing.   Application filed December 12, 1923.   Serial No. 680,265.

The present invention relates to an insect destroyer and more particularly to an insecticide to be used in destroying boll weevil, potato bugs and other insects injurious to plant life. It may also be effectively used in exterminating and driving away pests infesting the household such as cock-roaches, ants, bed-bugs and the like.

A material or composition to be used effectively as an insecticide must first of all be poisonous and fatal to insects when consumed even in the minutest quantities but if to be used in the house, it should be much less and preferably not at all poisonous to human beings. An insecticide, particularly one to be used on plants growing in the field, should be relatively insoluble in water so as not to be washed off by every shower or partially or completely removed by every dew. Moreover, an insecticide should, of course, be harmless to foliage and must possess the power of adhering tenaciously to the plant and to the leaves.

The insecticide forming the subject matter of the present invention answers all the conditions set forth above and will, as I have found, when applied to growing plants, destroy insects, for example, beetles, which makes it very efficacious for use against the potato bug, boll weevil and other harmful and destructive pests.

With the above and other objects in view, the invention will be best understood by having reference to the following detailed description and it is to be understood that various changes as to the proportions of the ingredients herein named may be made or altered and come within the scope of the invention without departing from the spirit thereof or sacrificing the efficiency of the same and which come within the scope of the appended claims in which I intend to claim all novelty permissible in view of the prior art.

Carbon bisulfid has been known to be effective for the destruction of some forms of insect life but its usefulness is very much limited because of its high volatility and the great fire risk involved in its use. I have now found that compounds formed by the union of carbon bisulfid with the organic bases or amines, that is, the thio-ureas as well as other organic sulfur compounds containing the $=C=S$ group are very effective in destroying insect life. The best known of the compounds of this type and the one commercially available in greatest quantities at the most reasonable price is symmetrical diphenyl-thio-urea, more commonly known as thio-carbanilide.

This material may be used in the dry state and may be readily dusted on the foliage of the plant, or scattered about near cracks in the floor or distributed wherever and whenever it be desired or it may be made into a suspension in any carrier liquid such as water, in any proportion that is desired and then sprinkled or sprayed upon the plant or near any insect-infested spot or plant. For spraying purposes, I have found that a suspension of about 1 pound of thiocarbanilide in 5 gallons of water is readily applied, but it is obvious that more or less water may be used if desired. Such a suspension has a wide covering power and because of its power of adherence to the plant foliage, its great destructiveness to insects and its relative harmlessness to human beings as well as its very slight solubility in water, the thioureas, and specifically thio-carbanilide comprises an ideal insecticide.

It would, of course be possible and entirely practicable, if desired, to dissolve a thio urea in a solvent and then spray the solution upon a plant or other infected place, but since the thio-ureas are only slightly soluble even in the more commonly used organic solvents, it is just as satisfactory and far more economical to apply the material in the manner as set forth.

It is also possible, if desired, to mix other substances with the thio-urea. Since my preferred class of compounds is apparently a violent poison to the insects when it is devoured by them, it is sometimes desirable, especially if the material is to be used within the house to destroy household pests to mix with the material a small amount of some sweetening agent such as sugar to encourage the insects to feed upon the material. This is not so necessary if the material is to be used on plant foliage, since all that is necessary there is to provide a sufficient quantity of material to coat portions of the foliage with the composition, as I have found that a small amount of the material is quickly fatal to the insect when ingested.

Since the suspension of the thio-urea in water has a tendency to settle out upon standing or even during its protracted use, it is desirable to shake the mixture occasionally while it is being sprayed or to stir it up if it is being scattered or brushed upon the foliage. I have found that the suspension of thiocarbanilide in water can be made more stable by the addition of a small amount of casein, glue, starch solution, or other thickener or stabilizer preferably of a colloidal nature whereupon the thio-urea remains in a more permanent state of suspension and is more readily applied.

My insecticide composition may also be used in the dry powdered state for dusting poultry, household pets such as dogs and cats, birds and the like, to destroy lice, fleas and the like and is so claimed in my Patent No. 1,573,490 which is a division and continuation of the present case. It is, however, especially effective as an insecticide for pests on growing plants when suspended in a liquid vehicle and applied in the manner hereinbefore set forth.

What I claim is:

1. A composition for use in destroying insect life which comprises a suspension of symmetrical di-phenyl-thio-urea in water.

2. A composition for use in destroying insect life which comprises a suspension of symmetrical di-phenyl-thiourea and starch in water.

In testimony whereof, I affix my signature.

CARL N. HAND.